United States Patent
Lee et al.

(10) Patent No.: US 6,465,408 B1
(45) Date of Patent: Oct. 15, 2002

(54) GRANULAR COATED SODIUM PERCARBONATE FOR DETERGENT

(75) Inventors: Sang Hwa Lee, Seoul; Yong Il Kim, Inchon-si; Sun Ki Shur, Chollabuk-do; Jong Pill Lee, Seoul, all of (KR)

(73) Assignee: Oriental Chemical Industries Co., Ltd., Seoul (KR)

( * ) Notice: Subject to any disclaimer, the term of this patent is extended or adjusted under 35 U.S.C. 154(b) by 0 days.

(21) Appl. No.: 09/576,256

(22) Filed: May 24, 2000

(30) Foreign Application Priority Data

Apr. 26, 2000 (KR) .......................................... 00-22251

(51) Int. Cl.$^7$ .............................. C11D 7/18; C11D 7/38; C11D 3/39; C01B 15/00

(52) U.S. Cl. ...................... 510/349; 510/375; 510/441; 252/186.27; 252/186.43

(58) Field of Search ................................ 510/349, 441, 510/375; 252/186.27, 186.43

(56) References Cited

U.S. PATENT DOCUMENTS

| | | |
|---|---|---|
| 4,105,827 A | 8/1978 | Brichard et al. |
| 4,120,812 A | 10/1978 | Lutz |
| 4,210,550 A | 7/1980 | Crnelissens |
| 4,260,508 A | 4/1981 | Maddox ...................... 252/99 |
| 4,287,135 A | 9/1981 | Stober et al. |
| 4,321,301 A | 3/1982 | Brichard et al. ............. 428/403 |
| 4,325,933 A | 4/1982 | Matsumoto et al. ..... 423/415 P |
| 4,327,151 A | 4/1982 | Mazzola |
| 4,329,244 A | 5/1982 | Brichard et al. ............... 252/99 |
| 4,372,882 A | 2/1983 | Koster et al. |
| 4,388,287 A | 6/1983 | Sugano et al. ........... 423/415 P |
| 4,409,197 A | 10/1983 | Sugano et al. ........... 423/415 P |
| 4,421,669 A | 12/1983 | Brichard et al. ....... 252/186.25 |
| 4,428,914 A | 1/1984 | Brichard et al. ............. 423/265 |
| 4,440,732 A | 4/1984 | Takeda et al. ........... 423/415 P |
| 4,526,698 A | 7/1985 | Kuroda et al. .................. 252/99 |
| 4,618,445 A | 10/1986 | Madan et al. .................. 252/99 |
| 4,657,784 A | 4/1987 | Olson |
| 4,671,972 A | 6/1987 | Schobel et al. |
| 4,681,695 A | 7/1987 | Divo |
| 4,707,287 A | 11/1987 | Herdeman |
| 4,726,908 A | 2/1988 | Kruse et al. |
| 4,731,195 A | 3/1988 | Olson |
| 4,759,956 A | 7/1988 | Amer et al. ................. 427/213 |
| 4,776,455 A | 10/1988 | Anderson et al. |
| 4,830,773 A | 5/1989 | Olson .................... 252/174.13 |
| 4,835,804 A | 6/1989 | Arnau-Munoz et al. |
| 4,863,626 A | 9/1989 | Coyne et al. |
| 4,966,762 A | 10/1990 | Pfeffer et al. ............. 423/415 P |
| 5,000,978 A | 3/1991 | Davidson et al. |
| 5,045,296 A | 9/1991 | Pfeffer et al. ............. 423/415 P |
| 5,167,854 A | 12/1992 | Deleeuw et al. ........ 252/186.27 |
| 5,187,011 A | 2/1993 | Manalastas et al. |
| 5,194,176 A | 3/1993 | Copenhafer et al. ... 252/186.27 |
| 5,200,236 A | 4/1993 | Lang et al. ................. 427/213 |
| 5,219,549 A | 6/1993 | Onda et al. .............. 423/415 P |
| 5,225,102 A | 7/1993 | Coyne et al. |
| 5,230,822 A | 7/1993 | Kamel et al. .......... 252/174.13 |
| 5,236,613 A | 8/1993 | Garner-Gray et al. |
| 5,244,644 A | 9/1993 | Doetsch ...................... 423/275 |
| 5,254,283 A | 10/1993 | Arnold et al. |
| 5,258,132 A | 11/1993 | Kamel et al. |
| 5,258,133 A | 11/1993 | Chapple ....................... 252/95 |
| 5,294,427 A | 3/1994 | Sasaki et al. ............. 423/415.2 |
| 5,312,557 A | 5/1994 | Onda et al. .................... 252/99 |
| 5,328,721 A | 7/1994 | Guiliano et al. ............. 427/213 |
| 5,332,518 A | 7/1994 | Kuroda et al. .................. 252/99 |
| 5,336,433 A | 8/1994 | Lagnemo et al. |
| 5,340,496 A | 8/1994 | Sato et al. ............. 252/186.27 |
| 5,346,680 A | 9/1994 | Roesler et al. .............. 423/274 |
| 5,366,655 A | 11/1994 | Yamashita et al. ...... 252/186.27 |
| 5,374,368 A | 12/1994 | Hauschild .................... 252/95 |
| 5,431,956 A | 7/1995 | Robb et al. |
| 5,462,804 A | 10/1995 | Kokubu et al. ......... 428/402.24 |
| 5,478,488 A | 12/1995 | Doetsch et al. |
| 5,482,642 A | 1/1996 | Agar et al. |
| 5,496,376 A | 3/1996 | Falotico et al. |
| 5,505,875 A | 4/1996 | Beaujean et al. ...... 252/186.27 |
| 5,507,972 A | 4/1996 | Bauer et al. ........... 252/174.25 |
| 5,516,449 A | 5/1996 | Agar et al. |
| 5,556,834 A | 9/1996 | James et al. ................. 510/375 |
| 5,560,896 A | 10/1996 | Bewersdorf et al. |
| 5,589,267 A | 12/1996 | Delwel et al. ............... 428/407 |
| 5,589,370 A | 12/1996 | Ratuiste et al. .............. 264/4.3 |
| 5,603,911 A | 2/1997 | Korvela et al. .............. 423/266 |
| 5,632,965 A | 5/1997 | Klasen et al. ............... 423/274 |
| 5,658,873 A | 8/1997 | Bertsch-Frank et al. .... 510/375 |
| 5,665,427 A | 9/1997 | Horne et al. ................. 427/212 |
| 5,670,470 A | 9/1997 | Horne et al. ................. 510/375 |
| 5,681,807 A | 10/1997 | Honig et al. ................. 510/375 |
| 5,690,701 A | 11/1997 | Bigini et al. .............. 23/302 R |

(List continued on next page.)

FOREIGN PATENT DOCUMENTS

| | | | |
|---|---|---|---|
| GB | 1 538 893 | | 5/1976 |
| GB | 1466799 A | * | 3/1977 |
| WO | WO 98/27007 | | 6/1998 |
| WO | WO-99/06321 A1 | * | 2/1999 |
| WO | WO-99/64350 A1 | * | 12/1999 |
| WO | WO 00/22080 | | 4/2000 |

*Primary Examiner*—Lorna M. Douyon
(74) *Attorney, Agent, or Firm*—Finnegan, Henderson, Farabow, Garrett & Dunner, LLP

(57) ABSTRACT

The present invention relates to a coated granular sodium percarbonate for detergent and its manufacturing process, and more particularly to a coated granular sodium percarbonate and its manufacturing process, wherein the surface of said sodium percarbonate establishes a multiple coating layer by being internally coated with a specific composition containing alkali metal silicate while externally coated with a specific composition containing alkali metal sulfate on upper part of said internally coated layer thus providing said sodium percarbonate an excellent dissolving rate in water as well as a good storage stability, preventing it from caking during delivery or storage, and being ultimately utilized as an effective detergent bleach containing zeolite as its detergent builder.

19 Claims, No Drawings

U.S. PATENT DOCUMENTS

| | | | |
|---|---|---|---|
| 5,691,296 A | 11/1997 | Agar et al. | |
| 5,698,326 A | 12/1997 | Wilson et al. | |
| 5,702,635 A | 12/1997 | Trani et al. | 252/186.27 |
| 5,705,466 A * | 1/1998 | Baillely et al. | 510/312 |
| 5,710,207 A | 1/1998 | Möller et al. | |
| 5,714,201 A * | 2/1998 | Bewersdorf et al. | 427/213 |
| 5,716,923 A | 2/1998 | MacBeath | |
| 5,747,438 A * | 5/1998 | MacBeath | 510/224 |
| 5,755,992 A | 5/1998 | Jeffrey et al. | |
| 5,759,988 A | 6/1998 | Heile et al. | |
| 5,773,399 A | 6/1998 | Baillely et al. | |
| 5,773,400 A | 6/1998 | Baillely et al. | |
| 5,795,854 A | 8/1998 | Angell et al. | |
| 5,827,811 A | 10/1998 | Lagnemo et al. | 510/377 |
| 5,846,922 A | 12/1998 | Lagnemo et al. | 510/375 |
| 5,851,420 A | 12/1998 | Kim et al. | 252/186.27 |
| 5,902,682 A | 5/1999 | Bertsch-Frank et al. | |
| 5,902,783 A | 5/1999 | Lagnemo et al. | 510/375 |
| 5,906,660 A | 5/1999 | Pardini et al. | 23/295 R |
| 5,929,015 A | 7/1999 | Lagnemo et al. | 510/378 |
| 5,935,708 A | 8/1999 | Schuette et al. | |
| 5,965,264 A | 10/1999 | Barenberg et al. | |
| 5,965,505 A | 10/1999 | Baillely et al. | |
| 5,990,073 A | 11/1999 | Garcia et al. | |
| 6,017,867 A | 1/2000 | Baillely et al. | |
| 6,054,066 A | 4/2000 | Honig et al. | 252/186.28 |
| 6,066,365 A | 5/2000 | Jackel et al. | |
| 6,071,431 A | 6/2000 | Lagnemo et al. | 252/186.25 |
| 6,080,710 A | 6/2000 | Withenshaw et al. | 510/312 |
| 6,113,805 A | 9/2000 | Schütte et al. | 252/186.2 |
| 6,218,352 B1 * | 4/2001 | Lee et al. | 510/375 |

\* cited by examiner

GRANULAR COATED SODIUM PERCARBONATE FOR DETERGENT

BACKGROUND OF THE INVENTION

1. Field of the Invention

The present invention relates to granular coated sodium percarbonate for detergent and its manufacturing process, and more particularly to granular coated sodium percarbonate and its manufacturing process, wherein the surface of said sodium percarbonate establishes a multiple coating layer by being internally coated with a specific composition containing alkali metal silicate while externally coated with a specific composition containing alkali metal sulfate on upper part of said internally coated layer thus providing said sodium percarbonate an excellent dissolving rate in water as well as a good storage stability, preventing it from caking during delivery or storage, and being ultimately utilized as an effective detergent bleach containing zeolite as its detergent builder.

2. Description of the Related Art

Sodium percarbonate when dissolved in water can eventually release the sodium carbonate and hydrogen peroxide, which are known to be environmentally safe and do not harm textiles when bleaching clothes and thus has been used as an oxygenated bleaching agent. The conventional powder type detergents generally contain sodium percarbonate in along with zeolite, a detergent builder, which accelerates the decomposition of sodium percarbonate. Therefore, it has been quite customary to coat the surface of sodium percarbonate with borate, silicate, sulfate or carbonate when it is used together with zeolite in order to increase stability.

With the introduction of energy conservation wave to protect the global environment, the way of wash has been also changing from hot temperature wash to either warm or cold wash and in some areas washing has been traditionally carried out at room temperature. However, if the dissolution rate of sodium percarbonate is poor the sodium percarbonate is hardly well dissolved during the wash cycle and thus either released into the sewage or remained in the clothes without exhibiting effective bleaching or sterilization. Therefore, it is shown that the dissolving speed plays a crucial role in effective utilization of sodium percarbonate.

There are roughly two different methods in manufacturing sodium percarbonate; i.e., the crystallization process and the fluidized bed spray granulation process. The crystallization process is a traditional standard wet method of that crystallizes crystal sodium percarbonate by the reaction between two solutions of sodium carbonate and hydrogen peroxide. The fluidized bed spray granulation process is a method that can increase the size of granular particles of seed by spraying said two solutions of sodium carbonate and hydrogen peroxide in fluidized bed processor by using small sodium percarbonate particles as a seed.

The crystallization process is a very complicated process that necessitates the steps of solubilization and purification of sodium carbonate in along with the granulation process to adjust the size of produced sodium percarbonate. However, the sodium percarbonate thus obtained have either non-spherical shapes or rough surface inappropriate for surface coating. In the case of the fluidized bed spray granulation process, hot blast of gas is essential to evaporate huge amount of water and the high energy consumption makes it uneconomical.

GB Pat. No. 1,538,893 disclosed a traditional coating method to increase the stability of sodium percarbonate by mixing sodium sulfate and sodium silicate. Sodium silicate is an effective coating material used in increasing the stability of sodium percarbonate, however, it has a low dissolving speed in water generally and also shows a caking during the delivery or storage. Further, when sodium silicate, as a coating material, is located at the outermost of the coating films, i.e., exposed on the surface, the caking becomes more accelerated. Sodium carbonate can also cause sodium percarbonate to be caked, and the single coating mixed with sodium carbonate, sodium sulfate and sodium silicate as disclosed in the GB Pat. No. 1,538,893 has the disadvantage of generating the caking as sodium silicate and sodium carbonate are exposed on the surface. In the case of the coated sodium percarbonate disclosed in the GB Pat. No. 1,538,893, the stability of said sodium percarbonate is worse than that of sodium perborate and the improvement in stability is also not noticeable as compared to uncoated sodium percarbonate. Therefore, the single coating method as described in the GB Pat. No. 1,538,893 is not desirable because of the ineffectiveness in increasing stability. Moreover, the current powder detergents distributed in the market contain zeolite which is known to accelerate the decomposition of sodium percarbonate, and thus the sodium percarbonate disclosed in the GB Pat. No. 1,538,893 is not recommended to use.

The drawbacks of coated sodium percarbonate are also mentioned in other prior art; i.e., U.S. Pat. No. 5,935,708 described that the coated sodium percarbonate showed a caking because the outermost coating layer of the coated sodium percarbonate consists mainly of sodium carbonate, and U.S. Pat. No. 5,902,682 pointed out that coated sodium percarbonate in general have a rapid decomposition of active oxygen and thus multi-coating is more preferred. U.S. Pat. Nos. 5,462,804 and 5,902,682 both disclosed the method to improve the stability of sodium percarbonate by coating in common with silicate, magnesium sulfate, and alkali metal salts such as carbonate, bicarbonate, and sulfate in a sequential order or simultaneously. Adding silicate or carbonate to magnesium sulfate generates insoluble magnesium silicate ($MgSiO_3$) or magnesium carbonate ($MgCO_3$) and once said insoluble coating films are formed on the surface of sodium percarbonate they can block the permeation of moisture into sodium percarbonate. However, said insoluble coating films are water-insoluble and thus procrastinating the rate of dissolution of sodium percarbonate. U.S. Pat. No. 5,462,804 mentioned about the effect of improved dissolution rate but the level of increased dissolution rate cannot be measured because the specific temperature to measure the rate of dissolution is not identified, and U.S. Pat. No. 5,902,682 does not describe anything about the rate of dissolution. Both of the above-mentioned U.S. Pat. used silicate and magnesium sulfate as coating substances thus resulting the low dissolution rate of sodium percarbonate. In addition, the outermost coating layer consists of either carbonate or silicate, or the mixture of carbonate, silicate, and magnesium sulfate, all of which incur the caking during the storage of sodium percarbonate. Caking can take place both in a packing container and a storage tank of sodium percarbonate, and the caking makes the free flowing and convey of sodium percarbonate quite troublesome.

U.S. Pat. No. 5,714,201 disclosed a method of restricting the modulus of $SiO_2/Na_2O$ of sodium silicate used in coating or manufacturing of sodium percarbonate to 1.5–2.3 in order to improve the dissolving speed. The above-mentioned modulus of sodium silicate can much influence the dissolution rate)of sodium percarbonate, and in general the greater the modulus of $SiO_2/Na_2O$, the slower the rate of dissolution of sodium percarbonate.

Here, the rate of dissolution of sodium percarbonate is influenced by the modulus of $SiO_2/Na_2O$ if the content of sodium silicate is more than 1 wt. % of sodium percarbonate, however, there is almost no influence by the modulus if the content of sodium silicate is less than 1 wt. %. Moreover, the sodium percarbonate is well dissolved when manufactured using sodium silicate having low modulus of $SiO_2/Na_2O$ of sodium silicate because the hydrophilic $Na_2O$ content increases; however, the sodium percarbonate absorbs moisture from the environment when stored for long period of time and results in caking. Therefore, it is more preferred to reduce the content of sodium silicate rather than adjusting the modulus of $SiO_2/Na_2O$ of sodium silicate to enhance the dissolving speed of sodium percarbonate. The U.S. Pat. No. 5,714,201 only focused on the increase of dissolving speed of sodium percarbonate according to the restricted modulus of $SiO_2/Na_2O$ of sodium silicate and there was nothing described about the long-term storage stability of sodium percarbonate according to the modulus of $SiO_2/Na_2O$ of sodium silicate.

U.S. Pat. No. 5,935,708 suggested a method to coat sodium percarbonate which was produced by fluidized bed spray granulation method to improve the stability of sodium percarbonate by using sodium sulfate alone. This method is advantageous in that it can provide a good dissolution rate for the sodium percarbonate because it does not use sodium silicate, however, the stability cannot be achieved by using sodium sulfate alone when the particles of sodium percarbonate are small.

In the method of coating sodium percarbonate by using sodium sulfate alone, the increase in stability in fact relies on the size of the sodium percarbonate particles rather than its manufacturing method, and the stability cannot be expected to increase by this method when the diameter of the sodium percarbonate particle is less than 0.6 mm. U.S. Pat. No. 5,935,708 does not disclose the diameter of the sodium percarbonate particles manufactured by the conventional crystallization method. In order to achieve the stability of the sodium percarbonate particles less than 0.6 mm in diameter, the coating content of sodium sulfate should be more than 10 wt. %, however, the increase coating content of sodium sulfate would also incur the loss of a great deal of active oxygen.

U.S. Pat. Nos. 5,532,518 (boric acid), 5,366,655 (Na-borate, metaborate), 5,556,834 (boric acid), 5,658,873 (tetraborate, pentaborate), 5,665,427(boric acid), 5,670,470 (boric acid) disclose coating methods by using boron compounds, however, the boron compounds are not appropriate as a coating material because they are not health-oriented nor environment-compatible.

U.S. Pat. Nos. 4,120,812 (PEG), 5,258,133 (Na-citrate) and 5,336,433 (fats, waxes) disclosed methods to coat the sodium percarbonate by using organic compounds. Further, organic compounds are more expensive than inorganic salts and the coated organic layer is oxidized by the sodium percarbonate and eventually degraded thus resulting in the decrease in the stability.

SUMMARY OF THE INVENTION

The present invention relates to a coated granular sodium percarbonate for detergent and its manufacturing process, and more particularly to a coated granular sodium percarbonate and its manufacturing process, wherein the surface of said sodium percarbonate establishes a multiple coating layer by being internally coated with a specific composition containing alkali metal silicate while externally coated with a specific composition containing alkali metal sulfate on upper part of said internally coated layer thus providing said sodium percarbonate an excellent dissolution rate in water as well as a good storage stability, preventing it from caking during delivery or storage, and being ultimately utilized as an effective detergent bleach containing zeolite as its detergent builder.

DESCRIPTION OF THE INVENTION

The object of the present invention is to manufacture granular coated sodium percarbonate which is stable to be used as a detergent composition, has a superior dissolution rate and can prevent caking phenomenon during delivery and storage.

The above-mentioned coated sodium percarbonate is characterized by whose surface being multi-coated with both inner layer and outer layer, wherein said inner layer comprises mixture of alkali metal silicate and at least one compound selected from sulfate, carbonate, and bicarbonate of alkali metals and said outer layer comprises mixture of alkali metal sulfate and at least one compound selected from carbonate and bicarbonate of alkali metals. In particular, the alkali metal silicate which comprises the inner layer is kept to be less than 1 wt. %, preferably 0.3–0.5 wt. %, in order to prevent the caking as well as the delay in dissolving rate. In prior art, it had been very common to use magnesium salts such as magnesium sulfate or magnesium chloride when using silicate as a coating material, however, said magnesium salts are now shown to deter the dissolving rate and thus the use of said magnesium salts are avoided in the present invention.

To manufacture uncoated sodium percarbonate, anhydrous sodium carbonate is continuously stirred in a reactor while aqueous hydrogen peroxide is being sprayed to form the sodium percarbonate particles. Here, to prevent the increase in temperature of reacting mixtures by exothermic reaction and also to prevent said reacting mixture from being got too wet, cold air is introduced into the reactor upon the initiation of the reaction to adjust the temperature (20–50° C.) and the water content (5–20%) of the reactant.

The constant introduction of cold air into the reactor while stirring anhydrous sodium carbonate in the reactor results in the formation of sodium percarbonate particles having a relatively larger size in diameter.

Thus obtained slightly wet sodium percarbonate particles are continuously passed into the fluidized bed dryer and are produced into dry sodium percarbonate.

Here, the particles either too big or too small are sorted out by a sieve screen while the recovered one are recharged into the reactor after pulverizing rather big particles. Then, sodium percarbonate containing more than 14 wt. % of active oxygen is produced without loss of hydrogen peroxide. Then, a certain amount of stabilizers are added as in conventional methods and U.S. Pat. No. 5,851,420 describes the stabilizers and the reaction conditions in more detail in the Examples. Thus obtained uncoated sodium percarbonate is then fluidized in the fluidized bed coater by means of fluidizing hot gas and the aqueous coating solution is sprayed along with air through a nozzle to generate a coating layer on the surface of sodium percarbonate. The coating solution can be sprayed counter-currently or co-currently with respect to the introduced fluidizing hot gas, typically air or inert gas, or alternatively in both directions.

The present invention can be delineated in more detail as follows. In manufacturing coated granular sodium percarbonate, alkali metal silicate used as an inner coating material is called according to the modulus of $SiO_2$/metal oxides ($M_2O$) as orthosilicate, metasilicate, disilicate or water glass, and they can be all used as coating materials of sodium percarbonate. If sodium percarbonate is produced by using alkali metal silicate with low modulus of $SiO_2$/metal oxides ($M_2O$) the resulting sodium percarbonate would have a good dissolution rate in water, however, its stability will be decreased and caking will be increased. On the other hand, if sodium percarbonate is produced by using alkali metal silicate with high modulus of $SiO_2$/metal oxides ($M_2O$) the resulting sodium percarbonate would have a poor dissolution rate in water, however, its stability will be increased.

Considering the characteristics of alkali metal silicate, the present invention produced a mixed composition comprising at least one compound selected from sulfate, carbonate, bicarbonate of alkali metals along with alkali metal silicate, which is known to have a good dissolution rate and a good stability. When the content of alkali metal silicate is more than 1 wt. % of sodium percarbonate, the dissolution rate increases as the modulus of $SiO_2$/metal oxides ($M_2O$) decreases. However, the extent that the dissolution rate can be improved is rather restricted and the rate of dissolution generally becomes 3–5 times slower than that of uncoated sodium percarbonate. When the content of alkali metal silicate is less than 1 wt. % of sodium percarbonate, the difference in dissolution rate according to the modulus of $SiO_2$/metal oxides ($M_2O$) is negligible, and alkali metal silicate is preferred to have the modulus of $SiO_2$/metal oxides ($M_2O$) of 2.5–3.5 considering that low modulus of $SiO_2$/metal oxides ($M_2O$) usually leads to the decrease in the stability. The dissolution rate and the stability can be improved when alkali metal silicate is mixed with at least one compound selected from sulfate, carbonate, and bicarbonate of alkali metals. When coating small amount of materials on the surface of sodium percarbonate, spraying of highly diluted coating materials would help to coat the surface rather evenly, however, it would require longer coating time and result in much energy consumption due to higher amount of water that needs to be evaporated. But applicants were surprised to discover that the content of alkali metal silicate is less than 1 wt. % of sodium percarbonate in coating the surface of sodium percarbonate, mixing alkali metal silicate with at least one compound selected from sulfate, carbonate, and bicarbonate of alkali metals would be able to provide improved stability and would have a good dissolution rate. Therefore, the present invention by mixing alkali metal silicate with at least one compound selected from sulfate, carbonate, and bicarbonate of alkali metals, could manufacture a coated sodium percarbonate which resolved the drawback of poor dissolution rate of the conventional ones while still enabling to maintain the improved stabilizing effect due to the addition of alkali metal silicate. To achieve both the good stability and the good dissolution rate have not been appeared very feasible; for example, U.S. Pat. Nos. 5,462,804, 5,714,201, and 5,902, 682 used alkali metal silicate as a coating material for the improvement of stability but the resulting products had prolonged dissolution rate, whereas U.S. Pat. Nos. 4,105, 827, 5,346,680, and 5,935,708 which did not use alkali metal silicate for the improvement of dissolution rate showed decreased stability of the products.

In the present invention, the alkali metal silicate as an inner coating material is preferred to be less than 1 wt. % of sodium percarbonate, more preferably to be 0.3–0.5 wt. %. Another coating material, i.e., at least one compound selected from sulfate, carbonate, and bicarbonate of alkali metals, is preferred to have its weight content based on anhydrous form being 1–3 times of that of alkali metal silicate. The total content of inner coating materials comprised as such is preferred to be 1–2 wt. % of anhydride-based sodium percarbonate.

Considering the above-mentioned alkali metal silicate used as an inner coating material caused caking, the coating of sodium percarbonate using alkali metal silicate is preferred to use multi-coating composed of at least two layers, and it is generally preferred that the inner coating layer is composed of alkali metal silicate while the outer coating layer is composed of a coating composition that can prevent the caking resulted from the alkali metal silicate. Therefore, the present invention used the mixture of alkali metal sulfate along with at least one compound selected from bicarbonate or carbonate of alkali metals as an outer coating material. That is, by adding an outer coating composed of alkali metal sulfate and the like on upper part of the inner coating layer, the present invention resolved the caking occurring during the delivery and storage of sodium percarbonate.

Using bicarbonate or carbonate of alkali metals as an outer coating material excluding alkali metal sulfate would not help to prevent the caking but would rather speed up the caking process instead. Adding alkali metal silicate in addition to the above-mentioned outer coating material can also help to alleviate the caking process but the effect may be negligible. Therefore, using alkali metal sulfate along with at least one selected from bicarbonate or carbonate of alkali metals in an appropriate ratio as an outer coating materials in order to improve the stability of sodium percarbonate as well as to prevent said caking process. The extent that the stability is increased is shown to be more obvious when the above-mentioned materials are used together compared to when they are used independently. Of the outer coating material in this invention, the amount of bicarbonate or carbonate of alkali metals is adjusted to take 10–25 wt. % of the total anhydride-based content of outer coating material. There would occur the caking of sodium percarbonate if the amount of bicarbonate or carbonate of alkali metals is more than 25 wt. % of the total outer coating amount, whereas the preventive effect will be completely lost if it is over 50 wt. % of the total outer coating amount. If the amount of bicarbonate or carbonate of alkali metals is less than 10 wt. % of the total outer coating amount, the synergistic effect generated by combining with alkali metal sulfate would be diminished. The total amount of anhydride-based outer coating is preferred to be approximately 4–8 wt. % of sodium percarbonate. If said amount is less than the above range, the improvement in stability is ineffective and dissolution rate is also decreased, whereas the amount of active oxygen content of coated sodium percarbonate becomes lower if said amount is relatively high. In U.S. Pat. No. 4,105,827 and GB Pat. No. 1,538,893, where alkali metal sulfate and alkali metal carbonate were used together, it appears that the relatively higher percentage of alkali metal carbonate resulted in the caking.

Both the inner and outer coating solutions can contain surfactants. Surfactants can lower the surface tension of coating solution so that the coating solution sprayed from the spray nozzle can be widely spread to produce multiple thin coating layers with rigidity upon contact with the surface of fluidizing sodium percarbonate particles, which would then help to increase the stability of said sodium percarbonate. The preferred amount of surfactant is 0.1–1 wt. % of the total coating solution and if the amount of surfactant is more than 1 wt. % the dissolution rate tends to be deteriorated. Anionic and nonionic surfactants can be both used.

In this invention, the sodium percarbonate to be coated becomes moved around by means of a fluidized bed coater which introduces fluidizing gas, typically air, from the lower part. Each coating solution is prepared as an aqueous solution so that it has 10–30 wt. % of concentration and is sprayed through one or more nozzles to either co-currently or counter-currently, or alternating in both directions relative to the fluidizing gas while maintaining a constant temperature and eventually becomes adhered to the surface of sodium percarbonate. The gas temperature used to fluidize sodium percarbonate is 80–130° C. and extreme care should be taken so that the temperature do not to go over 130° C. because the sodium percarbonate will be decomposed beyond that temperature. It is also important to keep the temperature of sodium percarbonate particles at 30–70° C. when spraying coating solutions by adjusting both the amount of coating solution and the air influx. Since the inner and outer coating solutions do not react with each other they can be sprayed using the same nozzle and upon completion of inner coating there needs a 2–5 min of drying which is then followed by outer coating. When all the coating procedure is completed, there will be another drying period of 4–10 min to get rid of all the remaining water content which would then result in the production of stable coated sodium percarbonate particles without loss of active oxygen during the coating process.

The following examples are intended to be illustrative of the present invention and should not be construed as limiting the scope of this invention defined by the appended claims.

PREPARATION EXAMPLE 1

Production of Uncoated Sodium Percarbonate

Anhydrous sodium carbonate and sodium metasilicate 5hydrates ($Na_2SiO_3 \cdot 5H_2O$) were put into a 30 L reactor at the rate of 9 kg/hr and 70 g/hr, respectively, which was equipped with an agitator and a temperature controller while spraying 6.7 kg/hr of 61 wt. % of hydrogen peroxide solution, wherein 0.65 wt. % of magnesium sulfate 7hydrates ($MgSO_4 \cdot 7H_2O$) was dissolved. The inner temperature of the reactor was kept at 40° C., and the amount of air and its temperature being introduced into the reactor were set at 15–60 L/min and 5–20° C., respectively, to let the water content of wet sodium percarbonate being produced kept at 14%. Wet sodium percarbonate particles were continuously conveyed to a fluidized bed dryer and dried by hot fluidizing gas of 110° C. for 1 hr, wherein both large particles over 1.0 mm and fine particles less than 0.25 mm we sifted out for removal. Thus obtained sodium percarbonates had 14.3 wt. % of active oxygen and the distribution of particles were 6% of 0.85 mm or above, 22% of 0.60–0.85 mm, 30% of 0.50–0.60 mm, 21% of 0.425–0.50 mm, 19% of 0.30–0.425 mm, and 2% of 0.25–0.30 mm.

EXAMPLE 1

2.0 kg of the uncoated sodium percarbonate particles obtained from the above Preparation Example 1 were put into a laboratory fluidized bed coater with a spray nozzle and were fluidized by hot air of 90° C. When the temperature of said sodium percarbonate particles in the coater reached 50° C., 200 g of mixed solution consisting of 5.0 wt. % of solid based water glass (the modulus of $SiO_2/Na_2O=3.2/1$) on solid content basis and 10.0 wt. % of sodium sulfate calculated as an anhydrous form were sprayed along with air through a nozzle counter-currently relative to the fluidizing air at the rate of 10 g/min for 20 min while maintaining the temperature of the inner coating solution at 40° C. during the coating process. Upon completion of spray, said sodium percarbonate particles were dried for 3 min while being fluidized, and then 650 g of mixed solution consisting of 15.4 wt. % of sodium sulfate calculated as an anhydrous form and 4.6 wt. % of sodium bicarbonate calculated as an anhydrous form were sprayed along with air through a nozzle counter-currently relative to the fluidizing air at the rate of 15 g/min for 43 min while maintaining the temperature at 45° C. for the outer coating solution. When coating was completed, said sodium percarbonate particles were dried for 5 min while being fluidized. The temperature of sodium percarbonate particles in the fluidized bed coater were kept at 55° C. during the inner coating while it was 48° C. during outer coating. As such, coated sodium percarbonate particles with 13.2 wt. % of active oxygen were manufactured and the results of analysis of said particles with respect to stability, dissolution rate in water, etc. including contents and ingredients of coating composition are shown in the Table 2.

Analysis of Stability I 1.5 g of sodium percarbonate and 1.5 g of commercial grade detergent zeolite 4A were evenly mixed, put into a 20 mL vial and gently patted 10 times. The above vial was then placed into a humidity camber with the lid open which was set at 30° C. and 80% of relative humidity for 72 hrs and then the amount of active oxygen was analyzed using potassium permanganate and the stability relative to the initial was calculated.

Analysis of Stability II 100 g of sodium percarbonate and 400 g of commercial grade phosphate-free concentrated powder detergent containing zeolite 4A, enzymes, etc. were evenly mixed, put into a cardboard box treated with water-repellent coating, and then sealed and placed in a humidity chamber set at 40° C. and 80% of relative humidity for 4 weeks and then the amount of active oxygen was analyzed using potassium permanganate and the stability relative to the initial was calculated.

Analysis of Dissolution Rate 1L of deionized water was put into an 1L beaker and stirred with a magnetic tirrer to generate a 4 cm vortex while maintaining the temperature at 20° C. Electrodes were set up inside the beaker and a recorder was prepared to record the conductivity. The moment that 2.5 g of sodium percarbonate was put into the beaker, the recorder was started to record and the dissolution rate was calculated based on the time required to reach 90% of the maximum conductivity in the recording sheet.

Analysis of Caking

After placing 200 g of sodium percarbonate on top of rayon cloth of 30 cm×30 cm, the edge of the cloth was united to form a spherical shape and was tied tighly with a string. It was then placed in a humidity chamber set at 40° C. and 80% of relative humidity for 15 hrs. The cloth was then opened wide and the caking was determined based on the change in the physical appearances of said sodium percarbonate. The following Table 1 shows the grades of said sodium percarbonate and it should be kept to degree 1 or 2 in order to prevent caking during transportation or storage.

TABLE 1

| Degree of Caking | Change in Physical Appearance of Sodium Percarbonate | Decision |
| --- | --- | --- |
| 1 | No Change | No Caking |
| 2 | Generation of lumps smaller than 1 cm | No Caking |
| 3 | Generation of lumps of 1–3 cm | Caking Possible |
| 4 | Generation of lumps larger than 4 cm | Caking Occur |

EXAMPLE 2

Using the same method as in the Example 1, 200 g of mixed solution consisting of 3.0 wt. % of solid content based water glass and 7.0 wt. % of sodium sulfate calculated as an anhydrous form was sprayed for 20 min at the rate of 10 g/min for inner coating, whereas 700 g of mixed solution consisting of 15.7 wt. % of sodium sulfate calculated as an anhydrous form and 4.3 wt. % of sodium bicarbonate calculated as an anhydrous form for 47 min at the rate of 15 g/min for the outer coating of sodium percarbonate.

As such, coated sodium percarbonate particles with 13.2 wt. % of active oxygen were manufactured and the results of analysis of said particles with respect to stability, dissolution rate, etc. including contents and ingredients of coating composition are shown in the Table 2.

COMPARATIVE EXAMPLE 1

Using the same method as in the Example 1, 267 g of 15.0 wt. % of solid content based water glass solution was sprayed for 27 min at the rate of 10 g/min for inner coating, whereas 600 g of mixed solution consisting of 6.3 wt. % of sodium sulfate calculated as an anhydrous form and 13.7 wt. % of sodium carbonate calculated as anhydrous form was sprayed for 44 min at the rate of 15 g/min for the outer coating of sodium percarbonate. As such, coated sodium percarbonate particles with 13.1 wt. % of active oxygen were manufactured and the results of analysis of said particles with respect to stability, dissolution rate, etc. including contents and ingredients of coating composition are shown in the Table 2.

COMPARATIVE EXAMPLE 2

Using the same method as in the Example 1, 100 g of 10.0 wt. % of solid content based water glass solution was sprayed for 10 min at the rate of 10 g/min for inner coating, whereas 750 g of mixed solution consisting of 6.1 wt. % of sodium sulfate calculated as an anhydrous form and 13.9 wt. % of sodium carbonate calculated as an anhydrous form was sprayed for 50 min at the rate of 15 g/min for the outer coating of sodium percarbonate. As such, coated sodium percarbonate particles with 13.1 wt. % of active oxygen were manufactured and the results of analysis of said particles with respect to stability, dissolution rate, etc. including contents and ingredients of coating composition are shown in the Table 2.

COMPARATIVE EXAMPLE 3

Using the same method as in the Example 1, 200 g of mixed solution consisting of 5.0 wt. % of solid content based water glass and 10.0 wt. % of sodium sulfate calculated as an anhydrous form was sprayed for 20 min at the rate of 10 g/min for inner coating of sodium percarbonate. When the spray was completed, the line and the spray nozzle were washed with deionized water for 2 min at the rate of 10 g/min while keep fluidizing said sodium percarbonate. After the completion of wash, 3 min of drying was performed as in the Example 1. Then, using the same method as in the Example 1, 700 g of mixed solution consisting of 14.3 wt. % of sodium sulfate calculated as an anhydrous form and 5.7 wt. % of magnesium sulfate calculated as an anhydrous form for 47 min at the rate of 15 g/min for the outer coating of sodium percarbonate. The line and the spray nozzle were washed with deionized water for 2 min at the rate of 10 g/min while keep fluidizing said sodium percarbonate and 5 min of drying was performed after the completion of wash as in the Example 1. As such, coated sodium percarbonate particles with 13.2 wt. % of active oxygen were manufactured and the results of analysis of said particles with respect to stability, dissolution rate, etc. including contents and ingredients of coating composition are shown in the Table 2.

COMPARATIVE EXAMPLE 4

Using the same method as in the Example 1, 640 g of mixed solution consisting of 1.6 wt. % of solid content based water glass and 7.2 wt. % of sodium sulfate calculated as an anhydrous form, and 16.2 wt. % of sodium carbonate calculated as an anhydrous form was sprayed for 43 min at the rate of 15 g/min for single coating of sodium percarbonate. As such, coated sodium percarbonate particles with 13.2 wt. % of active oxygen were manufactured and the results of analysis of said particles with respect to stability, dissolution rate, etc. including contents and ingredients of coating composition are shown in the Table 2. Here, the coating composition of the coated sodium percarbonate was the same as in the above Comparative Example 2, and the difference was made in that the Comparative Example 2 performed double coating while Comparative Example 4 performed single coating.

COMPARATIVE EXAMPLE 5

Using the same method as in the Example 1, 500 g of 20.0 wt. % of magnesium sulfate calculated as an anhydrous form was sprayed for 33 min at the rate of 15 g/min for inner coating, whereas 700 g of mixed solution consisting of 14.3 wt. % of sodium carbonate calculated as an anhydrous form and 5.7 wt. % of solid content based water glass was sprayed for 47 min at the rate of 15 g/min for the outer coating of sodium percarbonate. The line and the nozzle were washed after each coating was completed as in the Comparative Example 3. As such, coated sodium percarbonate particles with 12.5 wt. % of active oxygen were manufactured and the results of analysis of said particles with respect to stability, dissolution rate, etc. including contents and ingredients of coating composition are shown in the Table 2.

COMPARATIVE EXAMPLE 6

Using the same method as in the Example 1, 800 g of 20.0 wt. % of sodium sulfate calculated as an anhydrous form was sprayed for 53 min at the rate of 15 g/min for single coating of sodium percarbonate. As such, coated sodium percarbonate particles with 13.1 wt. % of active oxygen were manufactured and the results of analysis of said particles with respect to stability, dissolution rate, etc. including contents and ingredients of coating composition are shown in the Table 2.

COMPARATIVE EXAMPLE 7

Using the same method as in the Example 1, 1200 g of 20.0 wt. % of sodium sulfate calculated as an anhydrous form was sprayed for 60 min at the rate of 20 g/min for single coating of sodium percarbonate. As such, coated sodium percarbonate particles with 12.6 wt. % of active oxygen were manufactured and the results of analysis of said particles with respect to stability, dissolution rate, etc. including contents and ingredients of coating composition are shown in the Table 2.

COMPARATIVE EXAMPLE 8

The uncoated sodium percarbonate particles used in the above Examples 1–2 and Comparative Examples 1–7 were analyzed and the results with respect to stability, dissolution rate, etc. are shown in the Table 2.

TABLE 2

| Classification | Active Oxygen (%) | Contents & Ingredients of Coating Composition (wt %)[1] | Dissolution rate (sec) | Stability I (%) | Stability II (%) | Degree of Caking[2] |
|---|---|---|---|---|---|---|
| Example 1 | 13.20 | (I)*A[3]:0.5/B[4]:1.0 (O)**B:5.0/C[5]:1.5 | 100 | 78 | 85 | 1 |
| Example 2 | 13.20 | (I)A:0.3/B:0.7 (O) B:5.5/C:1.5 | 90 | 78 | 86 | 1 |
| Comparative Example 1 | 13.10 | (I)A:2.0 (O) B:1.9/D[6]:4.1 | 300 | 75 | 82 | 4 |
| Comparative Example 2 | 13.10 | (I)A:0.5 (O) B:2.3/D:5.2 | 150 | 68 | 75 | 4 |
| Comparative Example 3 | 13.20 | (I)A:0.5/B:1.0 (O) B:5.0/E[7]:2.0 | 200 | 79 | 86 | 2 |
| Comparative Example 4 | 13.20 | (S)***A:0.5/B:2.3/D:5.2 | 100 | 62 | 70 | 4 |
| Comparative Example 5 | 12.50 | (I)E:5.0 (O) D:5.0/A:2.0 | 400 | 80 | 87 | 4 |
| Comparative Example 6 | 13.10 | (S) B:8.0 | 80 | 60 | 67 | 1 |
| Comparative Example 7 | 12.60 | (S) B:12.0 | 90 | 65 | 72 | 1 |
| Comparative Example 8 | 14.30 | Uncoated Sodium Percarbonate | 70 | 45 | 50 | — |

[1]wt % relative to the wt of sodium percarbonate
[2]See Table 1.
[3]A: water glass: sodium silicate ($SiO_2/Na_2O = 3.2/1$)
[4]B: $Na_2SO_4$
[5]C: $NaHCO_3$
[6]D: $Na_2CO_3$
[7]E: $MgSO_4$
*(I): inner coating
**(O): outer coating
***(S): single coating The above Table 2 shows that coated sodium percarbonate particles produced in accordance with the method of the present invention as in the above Examples 1 and 2 are superior to those shown in Comparative Examples 1–7, with respect to stability, dissolution rate, etc. In comparison between Examples 1–2 and Comparative Examples 1–2, for example, the Comparative Example 2 showed an improved dissolution rate but the stability dropped drastically compared to that of Comparative Example 1 when the amount of sodium silicate was decreased, whereas Examples 1 and 2 of the present invention showed improved stability even with the decrease of the amount of sodium silicate and also there was observed a much elevated effect of dissolution rate compared to that of Comparative Example 2. This improved effect of stability was mainly ascribed to the relatively more homogeneous coating film generated by performing the inner coating using sodium sulfate in addition to the small amount of sodium silicate, as compared to the case in Comparative Example 2, where only small amount of sodium silicate was used as a coating substance; moreover, the highly hydrophilic sodium sulfate mixed with sodium silicate are expected to help dissolve the coating film of the sodium silicate rather easily thus resulting in the increase dissolving speed in water.

As mentioned in the above, the addition of magnesium sulfate to the sodium silicate generally results in the delay in dissolving speed compared to when the sodium silicate was used alone. The comparisons between Example 1 and Comparative Example 3, and between Comparative Example 1 and Comparative Example 5 reveal that there was a much decrease in dissolving speed when using magnesium sulfate additionally albeit a slight increase was observed in stability. Further, in Comparative Example 3 and Comparative Example 5, the line and the spray nozzle were washed off after outer coating as well as inner coating, and the line and the nozzle would be plugged up with water-insoluble materials if the washing step is omitted. This plugging results from the magnesium silicate generated by the reaction between sodium silicate and magnesium sulfate, and the requirement of an additional washing step would lengthen the coating procedure and thus not cost-effective. To install the line and the nozzle separately as a way to avoid said additional washing step also appears not very economical as compared to the Example 1. Therefore, it is not recommended to use magnesium compounds such as magnesium sulfate in along with sodium silicate when it comes to a coating.

From the Comparative Example 2 and Comparative Example 4, it can be easily noticed that there is a much difference between single coating and the multiple coating even when using the same coating composition. For example, Comparative Example 2, where multiple coating was applied, revealed superior stability as compared to that in Comparative Example 4, thus proving that it is more preferred to employ multiple coating in order to bring about an effective stability. In Comparative Examples 6 and 7, where sodium silicate were not used, the dissolution rate was shown to be excellent, however, there was no observable improvement in stability. The increased amount of sodium sulfate for coating generally results in the improvement of the stability; however, the increase in sodium sulfate also results in the decrease of the amount of active oxygen and thus appears not very appropriate to be used in the production of high quality coated sodium percarbonate.

As aforementioned, the outermost coating film comprising sodium silicate or sodium carbonate would incur caking, and the Comparative Examples 1, 2, 4 and 5 in the present invention all had their outermost coating film having either high amount of sodium carbonate or mixed content comprising sodium silicate and sodium carbonate, and thus resulted in caking. On the other hand, the above Examples of the present invention all had their outer coating film being mainly consisted of sodium sulfate and the caking did not occur. Therefore, it is highly preferred to keep the content of sodium sulfate as a substance of outer coating layer composition at its highest level when being mixed with other ingredient or solely using it alone in order to avoid said caking of sodium percarbonate.

EXAMPLE 3

Coated sodium percarbonate was manufactured according to the method as in the above Example 1, with the only difference made in spray direction of coating solution. 210 g of mixed solution consisting of 2.8 wt. % of solid content based water glass and 6.7 wt. % of sodium sulfate calculated as an anhydrous form, 0.5 wt. % of anionic surfactant (AOS, α-olefinsulfonate) was sprayed along with air cocurrently relative to fluidizing air for 21 min at the rate of 10 g/min for inner coating, whereas 705 g of mixed solution consisting of 15.6 wt. % of sodium sulfate calculated as an anhydrous form and 4.3 wt. % of sodium bicarbonate calculated as an anhydrous form, and 0.14 wt. % of anionic surfactant (AOS, α-olefinsulfonate) was sprayed along with air cocurrently relative to fluidizing air for 47 min at the rate of 15 g/min for the outer coating of sodium percarbonate. As such, coated sodium percarbonate particles with 13.2 wt. % of active oxygen were manufactured and the results of analysis of said particles with respect to stability, dissolution rate, etc. including contents and ingredients of coating composition are shown in the Table 3.

COMPARATIVE EXAMPLE 9

Coated sodium percarbonate was manufactured according to the method as in the above Example 3, with the only difference that the modulus of $SiO_2/Na_2O$ of water glass was 1.8/1. 210 g of mixed solution consisting of 2.8 wt. % of solid content based said water glass and 6.7 wt. % of sodium sulfate calculated as an anhydrous form, 0.5 wt. % of anionic surfactant (AOS, α-olefinsulfonate) was sprayed along with air cocurrently relative to fluidizing air for 21 min at the rate of 10 g/min for inner coating, whereas 705 g of mixed solution consisting of 15.6 wt. % of sodium sulfate calculated as an anhydrous form, and 4.3 wt. % of sodium bicarbonate calculated as an anhydrous form, and 0.14 wt. % of anionic surfactant (AOS, α-olefinsulfonate) was sprayed along with air cocurrently relative to fluidizing air for 47 min at the rate of 15 g/min for the outer coating of sodium percarbonate. As such, coated sodium percarbonate particles with 13.2 wt. % of active oxygen were manufactured and the results of analysis of said particles with respect to stability, dissolution rate, etc. including contents and ingridents of coating composition are shown in the following Table 3.

TABLE 3

| Classification | Active Oxygen (%) | Contents & Ingredients of Coating Composition (wt %)[1] | Dissolution Rate (sec) | Stability I (%) | Stability II (%) | Degree of Caking[2] |
| --- | --- | --- | --- | --- | --- | --- |
| Example 3 | 13.20 | (I)*A[3]:0.3/B[4]:0.7/AOS:0.05 (O)**B:5.5/C[5]:1.5/AOS:0.05 | 90 | 83 | 91 | 1 |
| Example 4 | 13.20 | (I)A[3]:0.3/D[6]:0.7/AOS:0.05 (O) B:5.5/D:1.5/AOS:0.05 | 90 | 83 | 92 | 1 |
| Comparative Example 9 | 13.20 | (I)A[3-1]:0.3/B:0.7/AOS:0.05 (O) B:5.5/C:1.5/AOS:0.05 | 90 | 75 | 83 | 2 |

[1] wt % relative to the wt of sodium percarbonate
[2] See Table 1.
[3] A: water glass: sodium silicate ($SiO_2/Na_2O$ = 3.2/1)
[3-1] A: water glass: sodium silicate ($SiO_2/Na_2O$ = 1.8/1)
[4] B: $Na_2SO_4$
[5] C: $NaHCO_3$
[6] D: $Na_2CO_3$
*(I): inner coating
**(O): outer coating
AOS: α-olefinsulfonate

EXAMPLE 4

In accordance with the method in the above Example 3, 210 g of mixed solution consisting of 2.8 wt. % of solid content based water glass and 6.7 wt. % of sodium carbonate calculated as an anhydrous form, 0.5 wt. % of anionic surfactant (AOS, α-olefinsulfonate) was sprayed along with air cocurrently relative to fluidizing air for 21 min at the rate of 10 g/min for inner coating, whereas 705 g of mixed solution consisting of 15.6 wt. % of sodium sulfate calculated as an anhydrous form and 4.3 wt. % of sodium carbonate calculated as an anhydrous form, and 0.14 wt. % of anionic surfactant (AOS, α-olefinsulfonate) was sprayed along with air cocurrently relative to fluidizing air for 47 min at the rate of 15 g/min for the outer coating of sodium The above Example 3 has the same coating composition as in the Example 2 except that there is an added ingredient of AOS in the Example 3. Therefore, they both had the same effect in terms of dissolution rate and prevention of caking and the increased stability in the Example 3 was due to the addition of AOS surfactant in the coating solution, which reduces the surface tension of said coating solution thus contributing the formation of durable, uniform coating film.

In the Example 4, the sodium sulfate of inner coating composition and the sodium bicarbonate of outer coating composition were both replaced by sodium carbonate and the analytic results of thus obtained coated sodium percarbonate particles were the same as in Example 3. That is, using sodium carbonate or sodium bicarbonate instead of a sodium sulfate as an ingredient of inner coating composition and using sodium carbonate or sodium bicarbonate along with sodium sulfate as an ingredient of outer coating composition are shown to be equally effective as well.

The Comparative Example 9 has the same coating composition except the modulus of $SiO_2/Na_2O$ of sodium silicate has been lowered. The lower modulus of $SiO_2/Na_2O$ incurred the decrease in the stability and the increase in caking, however, there was no noticeable change in terms of dissolution rate. Therefore, it appears not desirable to have low modulus of $SiO_2/Na_2O$ of sodium silicate considering the drawback being experienced in stability.

EXAMPLE 5

Uncoated sodium percarbonate particles used in the Example 1 were sifted out by using a sieve screen of size 0.50 mm. The active oxygen of thus obtained sodium percarbonate whose particle size was above 0.50 mm was 14.4 wt. %, and the size distribution of said sodium percarbonate particles were 9% of 0.85 mm or above, 38% of 0.60–0.85 mm, 52% of 0.50–0.60 mm, and 1% of 0.425–0.50 mm. These sodium percarbonate particles were then coated according to the method in the Example 1. 310 g of mixed solution consisting of 3.2 wt. % of solid content based water glass (the modulus of $SiO_2/Na_2O=3.2/1$) and 6.5 wt. % of sodium sulfate calculated as an anhydrous form, 0.3 wt. % of anionic surfactant (AOS, α-olefinsulfonate) was sprayed along with air cocurrently relative to fluidizing air for 31 min at the rate of 10 g/min for inner coating, whereas 455 g of mixed solution consisting of 16.7 wt. % of sodium sulfate calculated as an anhydrous form and 3.1 wt. % of sodium bicarbonate calculated as an anhydrous form, and 0.22 wt. % of anionic surfactant (AOS, α-olefinsulfonate) was sprayed along with air cocurrently relative to fluidizing air for 30 min at the rate of 15 g/min for the outer coating of sodium percarbonate. As such, coated sodium percarbonate particles with 13.5 wt. % of active oxygen were manufactured and the results of analysis of said particles with respect to stability, dissolution rate, etc. including contents and ingredients of coating composition are shown in the Table 4.

COMPARATIVE EXAMPLE 10

Using the same method as in Example 5, 800 g of 15.0 wt. % of sodium sulfate calculated as anhydrous form was sprayed for 53 min at the rate of 15 g/min for single coating of sodium percarbonate. As such, coated sodium percarbonate particles with 13.4 wt. % of active oxygen were manufactured and the results of analysis of said particles with respect to stability, dissolution rate, etc. including contents and ingredients of coating composition are shown in the Table 4.

COMPARATIVE EXAMPLE 11

The uncoated sodium percarbonate particles used in the above Example 5 and Comparative Example 10 were analyzed and the results with respect to stability, dissolution rate, etc. are shown in the Table 4.

TABLE 4

| Classification | Active Oxygen (%) | Contents & Ingredients of Coating Composition (wt %)[1] | Dissolution Rate (sec) | Stability I (%) | Stability II (%) | Degree of Caking[2] |
|---|---|---|---|---|---|---|
| Example 5 | 13.50 | (I)*A[3]:0.5/B[4]:1.0/AOS:0.05 (O)**B:3.8/C[5]:0.7/AOS:0.05 | 100 | 90 | 97 | 1 |
| Comparative Example 10 | 13.40 | (S)***B:6.0 | 90 | 72 | 79 | 1 |
| Comparative Example 11 | 14.40 | Uncoated Sodium Percarbonate | 80 | 55 | 61 | — |

[1] wt % relative to the wt of sodium percarbonate
[2] See Table 1.
[3] A: water glass: sodium silicate ($SiO_2/Na_2O = 3.2/1$)
[4] B: $Na_2SO_4$
[5] C: $NaHCO_3$
*(I): inner coating
**(O): outer coating
***(S): single coating
AOS: α-olefinsulfonate In Example 5 of Table 4, the coating of sodium percarbonate was performed so that the amount of coating could be reduced as the size of said sodium percarbonate particles become larger, however, the stability was unexpectedly shown to improve. In Comparative Example 10, where single coating was performed using sodium sulfate alone, the stability was shown to be improved as compared to those in Comparative Examples 6 and 7, but was much inferior to the coated sodium percarbonate in the Example 5 of the present invention.

What is claimed is:

1. Coated granular sodium percarbonate whose surface is multi-coated with both an inner layer and an outer layer, wherein said inner layer comprises a mixture of alkali metal silicate and at least one compound selected from the group consisting of sulfate, carbonate, and bicarbonate of alkali metals and said outer layer comprises a mixture of alkali metal sulfate and at least one compound selected from the group consisting of carbonate and bicarbonate of alkali metals, wherein said outer layer does not comprise magnesium sulfate, wherein the molar ratio of $SiO_2/M_2O$ in said alkali metal silicate ranges from about 3.2 to 3.5.

2. Coated granular sodium percarbonate in accordance with claim 1, wherein the amount of said alkali metal silicate based on solid content is less than 1 wt. % of sodium percarbonate.

3. Coated granular sodium percarbonate in accordance with claim 2, wherein the amount of said alkali metal silicate based on solid content is 0.3–0.5 wt. % of sodium percarbonate.

4. Coated granular sodium percarbonate in accordance with claim 1, wherein said inner layer contains at least one compound selected from the group consisting of sulfate, carbonate, and bicarbonate of alkali metals the amount of which based on anhydrous form is 1–3 times of alkali metal silicate.

5. Coated granular sodium percarbonate in accordance with claim 1, wherein the total coated amount of said inner layer based on anhydrous form is 1–2 wt. % of sodium percarbonate.

6. Coated granular sodium percarbonate in accordance with claim 1, wherein the amount of carbonate or bicarbonate of alkali metals based on anhydrous form in said outer layer is 10–25 wt. % of the total coated amount of said outer layer.

7. Coated granular percarbonate in accordance with claim 1, wherein the total coated amount based on anhydrous form of said outer layer is 4–8 wt. % of sodium percarbonate.

8. Coated granular sodium percarbonate in accordance with claim 1, wherein at least one of the inner layer and the outer layer further comprises a surfactant.

9. Coated granular percarbonate in accordance with claim 8, wherein said surfactant is either an anionic surfactant or a nonionic surfactant.

10. A detergent composition containing a zeolite builder and a bleaching agent, wherein said bleaching agent is the granular coated sodium percarbonate of claim 1.

11. Coated granular sodium percarbonate whose surface is multi-coated with both an inner layer and an outer layer, wherein said inner layer comprises a mixture of alkali metal silicate and at least one compound selected from the group consisting of sulfate, carbonate, and bicarbonate of alkali metals and said outer layer comprises a mixture of alkali metal sulfate and at least one compound selected from the group consisting of carbonate and bicarbonate of alkali metals, wherein the ratio of $SiO_2/M_2O$ in said alkali metal silicate ranges from about 3.2 to 3.5 and wherein at least one of said inner layer and said outer layer further comprises at least one surfactant.

12. Coated granular sodium percarbonate in accordance with claim 11, wherein the amount of said alkali metal silicate based on solid content is less than 1 wt. % of sodium percarbonate.

13. Coated granular sodium percarbonate in accordance with claim 12, wherein the amount of said alkali metal silicate based on solid content is 0.3–0.5 wt. % of sodium percarbonate.

14. Coated granular sodium percarbonate in accordance with claim 11, wherein said inner layer contains at least one compound selected from the group consisting of sulfate, carbonate, and bicarbonate of alkali metals the amount of which based on anhydrous form is 1–3 times of the amount of alkali metal silicate.

15. Coated granular sodium percarbonate in accordance with claim 11, wherein total coated amount of said inner layer based on anhydrous form is 1–2 wt. % of sodium percarbonate.

16. Coated granular sodium percarbonate in accordance with claim 11, wherein the amount of carbonate or bicarbonate of alkali metals based on anhydrous form in said outer layer is 10–25 wt. % of the total coated amount of said outer layer.

17. Coated granular sodium percarbonate in accordance with claim 11, wherein the total coated amount based on anhydrous form of said outer layer is 4–8 wt. % of sodium percarbonate.

18. Coated granular sodium percarbonate in accordance with claim 11, wherein said at least one surfactant is selected from the group consisting of anionic surfactants and nonionic surfactants.

19. A detergent composition containing a zeolite builder and a bleaching agent, wherein said bleaching agent is the granular coated sodium percarbonate of claim 11.

* * * * *

UNITED STATES PATENT AND TRADEMARK OFFICE
CERTIFICATE OF CORRECTION

PATENT NO.    : 6,465,408 B1
DATED         : October 15, 2002
INVENTOR(S)   : Sang Hwa Lee et al.

It is certified that error appears in the above-identified patent and that said Letters Patent is hereby corrected as shown below:

<u>Column 17,</u>
Line 36, after "wherein the" insert -- molar --.

Signed and Sealed this

Twenty ninth Day of April, 2003

JAMES E. ROGAN
*Director of the United States Patent and Trademark Office*